(12) United States Patent
Hinderthür

(10) Patent No.: US 7,945,160 B2
(45) Date of Patent: May 17, 2011

(54) METHOD AND SYSTEM OF MONITORING A DATA TRANSMISSION LINK, PARTICULARLY AN OPTICAL, BIDIRECTIONAL DATA TRANSMISSION LINK

(75) Inventor: Henning Hinderthür, Finning (DE)

(73) Assignee: ADVA AG Optical Networking, Meiningen (DE)

( * ) Notice: Subject to any disclaimer, the term of this patent is extended or adjusted under 35 U.S.C. 154(b) by 646 days.

(21) Appl. No.: 12/047,006

(22) Filed: Mar. 12, 2008

(65) Prior Publication Data
US 2008/0240712 A1 Oct. 2, 2008

(30) Foreign Application Priority Data
Mar. 29, 2007 (DE) .......................... 10 2007 015 628

(51) Int. Cl.
*H04B 10/08* (2006.01)

(52) U.S. Cl. ................ 398/33; 398/162; 398/9; 398/20; 398/25; 398/30; 398/31; 370/241; 370/242; 370/252; 356/73.1

(58) Field of Classification Search .................... 398/33, 398/177, 180, 181, 25, 26, 27, 9, 11, 17, 398/16, 18, 173, 162, 79, 140, 141, 135, 398/136, 137, 138, 10, 13, 14, 20, 21, 28, 398/30, 32, 34, 38, 22, 23, 24, 42, 43, 82, 164; 370/241, 242, 243, 343, 249, 252; 356/73.1
See application file for complete search history.

(56) References Cited

U.S. PATENT DOCUMENTS

| 6,323,981 B1 * | 11/2001 | Jensen ............................ 398/11 |
| 6,708,004 B1 * | 3/2004 | Homsey ......................... 398/177 |
| 2004/0096214 A1 | 5/2004 | Morreale et al. |

FOREIGN PATENT DOCUMENTS

| DE | 198 32 562 A1 | 1/2000 |
| EP | 1 309 125 B1 | 4/2006 |

* cited by examiner

*Primary Examiner* — Hanh Phan
(74) *Attorney, Agent, or Firm* — The Culbertson Group, P.C.

(57) ABSTRACT

Systems and methods for monitoring a data transmission link, especially an optical, bidirectional data transmission link, in which a digital transmit signal is transmitted on a first transmission path from a local end of the data transmission link toward a remote end of the data transmission link. A portion of the power of the transmit signal sent at the local end is transmitted, delayed by a non-zero delay time on a second transmission path as a control signal toward the remote end of the data transmission link. Both signals are received at the remote end and are tested for the presence of events of a predetermined type. A conclusion can be reached on the quality of the transmission link as a function of a time correlation and frequency of the appearance of events in the received transmit signal and in the received control signal.

13 Claims, 2 Drawing Sheets

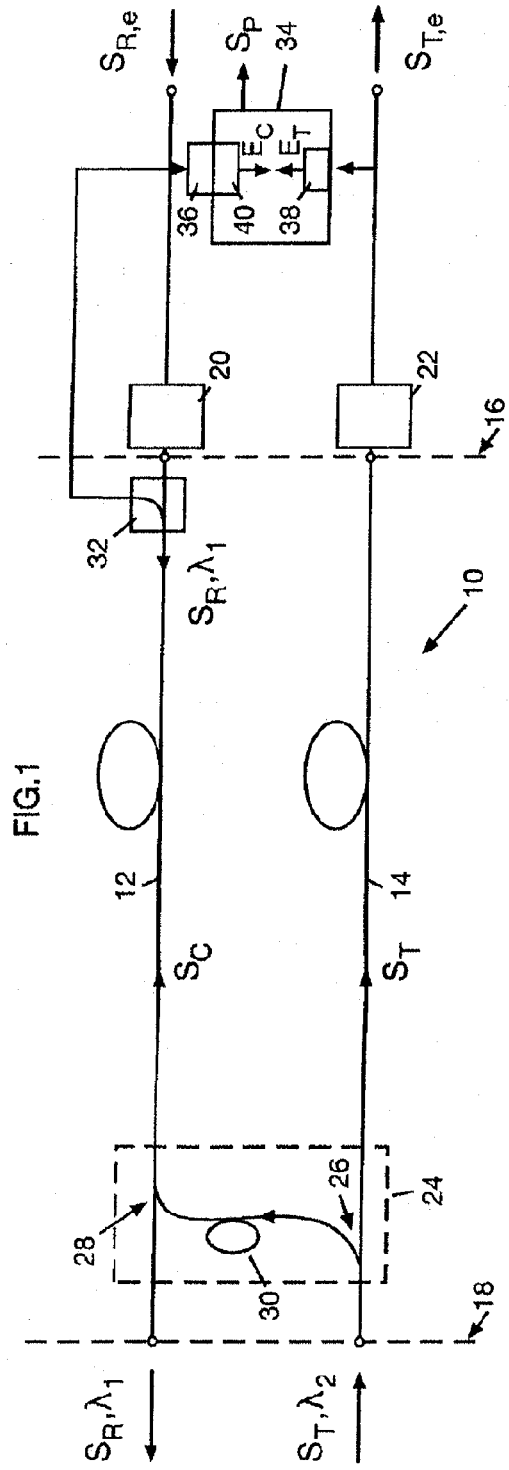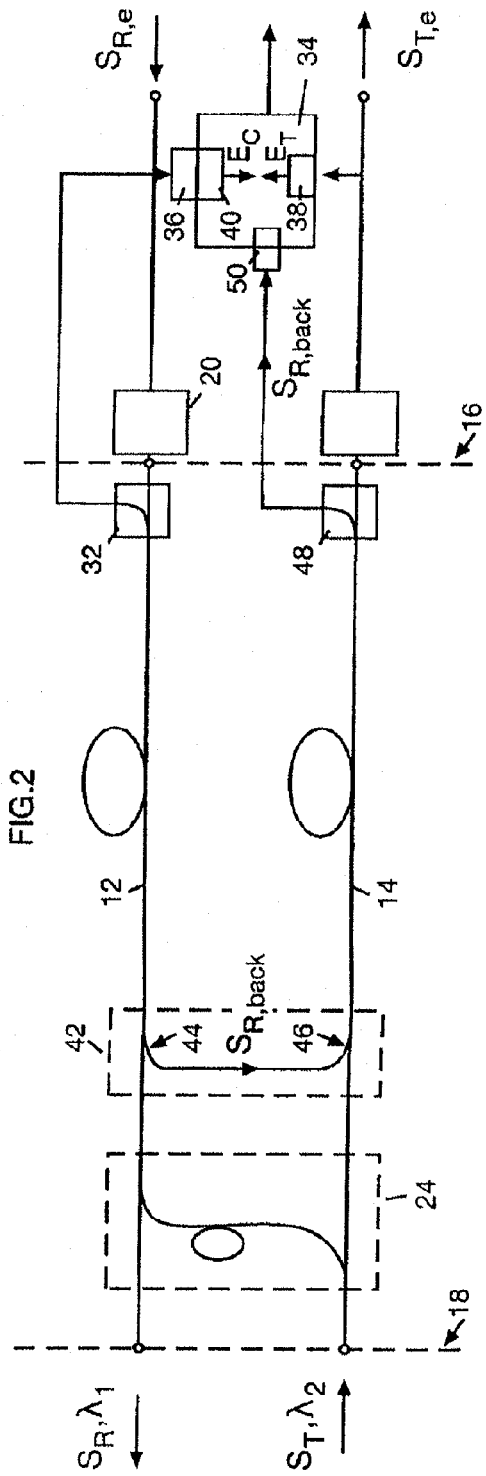

METHOD AND SYSTEM OF MONITORING A DATA TRANSMISSION LINK, PARTICULARLY AN OPTICAL, BIDIRECTIONAL DATA TRANSMISSION LINK

CROSS REFERENCE TO RELATED APPLICATIONS

Pursuant to 35 U.S.C. §119, this application claims the benefit of prior German Patent Application No. 10 2007 015 628.8, filed Mar. 29, 2007. The prior application is hereby incorporated by reference in its entirety for all purposes.

TECHNICAL FIELD

The invention relates to a method for monitoring a data transmission link, especially an optical data transmission link, with the goal of reaching a conclusion on the performance of the overall data transmission or on an individual service as part of the overall data transmission to a certain endpoint of the transmission link, a so-called demarcation line.

BACKGROUND

For the commercial preparation of Ethernet-based connection services, so-called Service Level Agreements are usually a central component of the contract between the network operator or service provider and the customer. Such Service Level Agreements describe in detail a minimum continuous performance of data transmission or service to be guaranteed by the network operator or service provider to the fixed demarcation line, that is, typically to the point at which the data or the service is transferred to the application device of the customer or is fed from this device onto the transmission link. To guarantee a certain performance of such a service or a certain quality of the data transmission, the continuous digital monitoring of the data transmission or the protocol at the demarcation line is necessary. This is realized according to known methods usually through the use of active transmission technology at the demarcation line, that is, at the customer site, and through the measurement and evaluation of digital performance data, such as, e.g., "loss of Ethernet frame" or the like. The performance data is then typically transmitted via an additional transmission channel from the customer site to the location of the network operator.

This type of active performance monitoring allows the verification and guaranteeing of compliance with agreements set down in Service Level Agreements. In addition, in this way a detailed error analysis is possible in the case of a fault.

However, the use of active transmission technology for determining performance data at a demarcation line, especially for the purpose of monitoring special services, leads to an increase in the hardware and software costs, as well as to an increase of the operating costs due to the necessary maintenance and commissioning of the active transmission technology at the customer site. In addition, network availability decreases due to the ever-present failure probability of active transmission technology.

SUMMARY OF THE INVENTION

The present invention is devised to provide a method for monitoring a data transmission link, especially an optical, bidirectional data transmission link, with which in a simple and economical way performance data of the overall data transmission via the transmission link or individual services can be determined. In addition, the invention presents devices for implementing such methods.

The invention starts from the idea that expensive installation and maintenance work at the demarcation line or at the customer site can be avoided if only passive transmission-related means have to be used at the customer site, in order to carry out the monitoring of the data transmission link in terms of its performance at the demarcation line from a remote end, for example, from the location of the network operator or service provider.

According to the invention, at the demarcation line or the local end of the transmission link, only a splitting-and-delay unit is provided, by means of which the transmit signal to be sent at the demarcation line, that is, the local end of the transmission link, is fed not only to a first data transmission path, but also, after a predetermined non-zero delay time, to a second transmission path of the transmission link. The second transmission path is already present in bidirectional transmission links, which are realized by means of two separate data transmission paths, for example, by means of two optical waveguides. The two transmission paths, however, can also be realized by means of a single transmission medium, for example, a single optical waveguide. In order to avoid undesired superpositioning of signals with the same transmission direction, for this purpose, different wavelengths or signals with orthogonal polarization directions could be used.

At the remote end of the data transmission link, that is, for example, at the location of the network operator or service provider, according to the invention, only a receiving and evaluation unit must be provided, to which is fed the transmit signal received at the remote end on the first and second transmission path. The receiving and evaluation unit can then check the received transmit signals for the appearance of events of a predetermined type and can arrive at a conclusion on the quality of the transmission link as a function of a time correlation and as a function of the frequency of the appearance of the events in the transmit signal transmitted and received via the first transmission path and in the control signal transmitted via the second transmission path.

According to one implementation of the invention, the transmission link can be bidirectional; that is, on the second transmission path, a receive signal can be transmitted from the remote end in the direction toward the local end of the data transmission link and can be received there, that is, at the demarcation line. The opposite-direction signals on the second data transmission path, that is, the control signal, on the one hand, and the receive signal transmitted from the remote end to the local end, on the other, do not influence the selection of a suitable transmission technology and a suitable transmission medium for forming the second transmission path. For example, for an optical transmission link, an optical waveguide can guide the opposite-direction signals, wherein these can also feature different wavelengths.

According to one embodiment of the invention, for the appearance of an event in the received transmit signal and in the received control signal delayed by an amount less than the amount of the difference between the signal propagation times via the first and second transmission paths, the decision is made that the cause of the event is impairment of both transmission paths. This is because, in this case, the impairment of the two signals must take place at a point of the transmission link that, viewed in the transmission direction, lies after the splitting of the transmit signal and the feeding of the control signal onto the second transmission path. In addition, an impairment that affects the two transmission paths in the same way would have to exist or have existed in the transmission link.

According to another implementation of the invention, the decision is made that the cause of the events, which feature both signals, but delayed by the delay time plus the difference between the signal propagation times via the first and second transmission paths, is not impairment of one of the two transmission paths, but rather that the event in question was already contained in the transmit signal before the splitting of the transmit signal at the demarcation line. Such events can thus remain outside of consideration for reaching a conclusion on the quality of the transmission link.

According to another embodiment of the invention, for the appearance of the event only in either the received transmit signal or the received control signal, the decision is made that the cause of this event was an impairment in either the first or the second transmission path.

According to the preferred embodiment of the invention, for making the decisions explained above, the cross-correlation function is used for the transmit signal received at the remote end of the data transmission link and the control signal received there or for corresponding signals derived from the received transmit signal and the received control signal. Preferably, the normalized cross-correlation function is used for evaluating the signal to be examined. The cross-correlation function can be determined continuously (quasi-continuously) for each time section of predetermined length of the two signals.

Instead of a cross-correlation of the received signals, digital event signals derived from these signals can also be used, in which the appearance of an event is indicated, for example, by a pulse. In practice, for this purpose an event counter, for example, a "bad frame counter" can be used.

Preferably, however, the correlation function is calculated only when an event is contained in the relevant time section. The time length of the section is selected to be at least as large as the sum of the amount of the propagation time difference via the two transmission paths and the predetermined delay time. In addition, it is sufficient to calculate the cross-correlation function at selected points.

If the cross-correlation of the two signals has the value one for a time shift $\tau$ less than or equal to the different between the signal propagation times, then it is assumed that the two signals containing the event are identical and were merely received at the remote end delayed by an amount less than the difference between the signal propagation times via the two transmission paths. In this case, the relevant event is traced back to an impairment in the transmission link and therefore must be considered for determining the performance or quality of the transmission link.

This conclusion can also be reached by evaluating the cross-correlation function at the position $\tau$ equal to the sum of the delay time and the difference between the signal propagation times. If a value of zero is determined at this position, even though an event is present in both signals, then the event must have originated after the splitting of the transmit signal in this signal or in the control signal. The event therefore must be considered. This procedure has the advantage that the cross-correlation function must be calculated merely for a certain $\tau$.

For the cross-correlation function, if a value of one is determined for a time shift equal to the delay time plus the difference between the signal propagation times via the two transmission paths, then it can be definitively concluded that the relevant impairment came about not in the course of the transmission link to be monitored, but rather before the point of the splitting of the transmit signal at the local end of the transmission link.

According to one embodiment of the invention, the total delay time of the two remote-side receive signals can be determined as the sum of the delay time and the difference between the signal propagation times in the first and second transmission paths determined in an initialization process. For this purpose, at the remote end of the transmission link, the transmit signal received on the first transmission path can be compared with the control signal received on the second transmission path with reference to a certain signal pattern. The time shift between two identical patterns in the two signals then can be determined similarly by evaluating the cross-correlation function. Optionally, such a measurement can be performed with or without the delay element at the local end of the transmission link. According to another embodiment of the invention, for a bidirectional data transmission, a portion of the power of the receive signal received on the second transmission path at the local end of the data transmission link can be coupled onto the first transmission path in the direction toward the remote end and received at the remote end. The receive signal, which is received at the remote end and which obviously may be superimposed in a non-separable way with the transmit signal already transmitted on the first transmission path, is checked for the appearance of events of the same type or a predetermined type, wherein the number of events appearing per unit time is used as a measure for reaching a conclusion on the quality of the second transmission path of the transmission link. Here, it involves a worst-case scenario, because the number of impairments possibly occurring in sequence on the transmission link in both the first and also second transmission paths obviously represents an upper limit for the impairments that occurred in just the second transmission path.

The preferred embodiments of the invention are explained in more detail below with reference to an embodiment shown in the drawing.

BRIEF DESCRIPTION OF THE DRAWINGS

FIG. 1 is a diagram of an optical transmission link with a local-side splitting-and-delay unit and a receiving and evaluation unit according to one embodiment.

FIG. 2 is a diagram of another embodiment of the transmission link in FIG. 1 with another local-side coupling unit.

DETAILED DESCRIPTION

Figure 3:
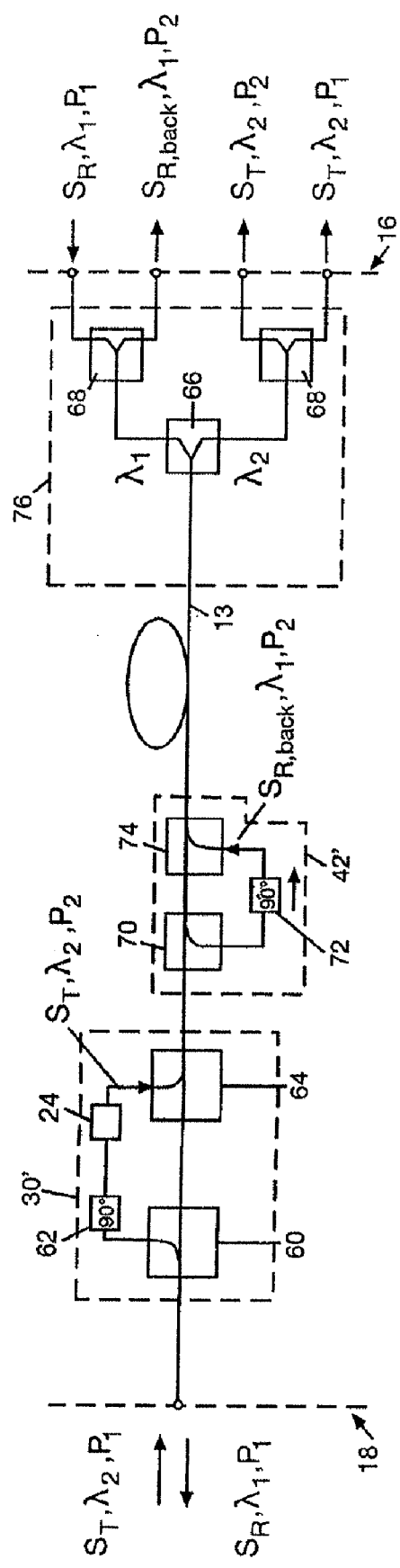
FIG. 3 is a diagram of another embodiment of a transmission link analogous to FIG. 2, but realized with a single optical waveguide.

The optical transmission link 10 shown in FIG. 1 includes two optical waveguides 12, 14, of which the optical waveguide 12 transmits an optical receive signal $S_R$ at the wavelength $\lambda_1$ from a remote end 16 to a local end 18 and an optical waveguide 14 transmits an optical transmit signal $S_T$ at the wavelength $\lambda_2$ from the local end 18 to the remote end 16. At the remote end 16 of the transmission link 10 there is an electro-optical converter unit 20, which performs an electro-optical conversion of the electrical receive signal $S_{R,e}$ into the optical receive signal $S_R$ and an opto-electrical converter unit 22, which converts the remote-side, received optical transmit signal $S_T$ into an electrical transmit signal $S_{T,e}$. In practice, the electro-optical converter unit 20 and the opto-electrical converter unit 22 can be contained, for example, in one channel card.

At the local end 18 of the transmission link 10 there is a splitting-and-delay unit 24, which includes a first coupler 26, a second coupler 28, and a delay unit 30. The first coupler 26 decouples a predetermined part of the optical power of the optical transmit signal $S_T$ from the optical waveguide 14 and feeds this signal to the delay unit 30, which delays the signal by a predetermined non-zero delay time. The delay unit can consist, for example, of an optical waveguide of predetermined length, wherein the signal group velocity multiplied with the length of the optical waveguide gives the delay time. The delayed signal is coupled into the optical waveguide 12 via the second coupler 28 as the control signal $S_C$.

At the remote end 16, the control signal $S_C$ is decoupled from the optical waveguide 12 by means of a third coupler 32 and is fed to a receiving and evaluation unit 34. At this point, it should be mentioned that the couplers 26, 28 and 32 involve typical, also wavelength-dependent couplers.

In addition, the transmit signal $S_{T,e}$ already opto-electrically converted by the opto-electrical converter unit 22 is also fed to the receiving and evaluation unit 34.

The receiving and evaluation unit 34 first converts the control signal $S_C$ fed to it opto-electrically by means of an opto-electrical converter unit 36 contained in the receiving and evaluation unit and feeds the converted signal to a second event detector 40. This detector evaluates the opto-electrically converted control signal $S_{C,e}$ with respect to the appearance of events of a certain type, such as, for example, "loss of frame" in an Ethernet signal. Such methods for Ethernet-frame analysis are known. The output signal of the event detector 40, the event signal $E_C$, in which, for example, each "bad frame" is represented by a pulse, then can be further processed or evaluated at less expense than the high-bit rate transmit signal $S_{T,e}$.

In the same way, a first event detector 38 contained in the receiving and evaluation unit 34 evaluates the already opto-electrically converted transmit signal $S_{T,e}$ fed to it with respect to the appearance of events of the predetermined type and generates a corresponding event signal $E_T$.

The receiving and evaluation unit 34 then evaluates the event signals $E_C$ and $E_T$ according to the following method, wherein it is noted that this method, which concerns the correlation analysis, could also be performed with the high-bit rate signals $S_{C,e}$ and $S_{T,e}$ directly.

For performing this evaluation method, the total propagation time difference $T_{total}$ between the signals $S_C$ and $S_T$ must be known to the receiving and evaluation unit 34. This value either can be reported to the receiving and evaluation unit 34 or it can be determined by it in an initialization process. For this purpose, the receiving and evaluation unit 34 can calculate the cross-correlation function, for example, for two time segments of the signals $S_C$ and $S_T$ and can determine the maximum of the cross-correlation function. If the signals were not interfered with in the transmission from the local end 18 to the remote end 16 and are therefore identical, then this produces the maximum value of the cross-correlation function for a time shift τ equal to the time shift of the received signals. This value then can be stored, if necessary, by the receiving and evaluation unit 34. Obviously, the accuracy can be improved through several repetitions of this procedure and by averaging the resulting values.

The propagation time difference of the signals via the two optical waveguides 12, 14 can be determined in an analogous manner, wherein, for this purpose, the delay unit 30 must be replaced with a corresponding coupler unit without a delay time. Alternatively, a delay unit can be used, which allows a continuous or stepped adjustment of the delay time, including the delay time $T_D=0$.

At this point, it should be noted that the delay time must be meaningfully selected, preferably significantly greater than the amount of the propagation time difference via the two transmission paths. Here, the propagation time difference can be determined in the scope of the initialization process, and then the delay time $T_D$ can be selected in a suitable way.

If the receiving and evaluation unit 34 knows the sum from the delay time $T_D$ and the propagation time difference of the signals via the optical waveguide 14 (first transmission path) and the optical waveguide 12 (second transmission path), then this unit performs the evaluation of the event signals $E_T$ and $E_C$ as follows.

If the receiving and evaluation unit 34 determines the appearance of an event in at least one of the event signals $E_T$ and $E_C$, then it calculates the cross-correlation function of these signals for a sufficiently large time section, in which lies the one or more detected events. The time section is selected using information on the total propagation time difference $T_{total}$, with the time section being selected at least as large as the propagation time difference $T_{total}$.

For the cross-correlation function, if a value of one is determined for a time shift τ equal to $T_{total}$, then this means that an event was contained in both signals and these were received at the remote end delayed by $T_{total}$ exactly. However, this is only possible if the relevant event was contained in the transmit signal $S_T$ before the splitting and delay unit. Thus, the appearance of this event cannot be assigned to the transmission link.

If a conclusion on the performance of the transmission link formed by the optical waveguide 14 is reached by counting events within a certain time unit, then the event can be used for the cross-correlation function for τ equal to $T_{total}$, in order to evaluate the signal $E_T$. If the value of the cross-correlation function is equal to one, then the relevant event is not counted. If the value of the cross-correlation function is equal to zero for τ equal to $T_{total}$, then the event is counted.

This procedure is described again briefly in the following table, where K(τ) designates the normalized cross-correlation function of the two signals $S_T$ and $S_C$ to be correlated or the corresponding time sections of these signals:

TABLE 1

Example Normalized Cross-correlation Function

| | |
|---|---|
| K(τ = $T_{total}$) = 1 | Event not caused by transmission link; Event can be suppressed; |
| K(τ = $T_{total}$) = 0 | Event must be considered; |

In other words, an event contained in the signal $E_T$ can remain outside of consideration if an event delayed by the delay time $T_D$ plus the difference between the signal propagation times in the optical waveguides 12 and 14 is contained in the signal $E_C$. This is because, in this case, the relevant event must have already been contained in the signal $S_T$, which was fed to the local end 18. In contrast, if the delay of the event contained in the signal $E_C$ is less than or equal to the pure propagation time difference between the signals via the optical waveguides 12, 14, then the error must be a result of impairment of both optical waveguides.

Thus, according to this method for reaching a conclusion on the performance of the overall data transmission or an individual service via the transmission link, which is made available through the optical waveguide 14 to a subscriber at the demarcation line or the local end 18, only the passive splitting-and-delay unit 24 is necessary. The evaluation can be performed remotely.

With this method, the receiving and evaluation unit 34 reaches a conclusion on the performance on the local-side demarcation line and can deliver this information by means of a performance signal $S_P$ to arbitrary locations or units.

FIG. 2 shows a refinement of the transmission link 10 in FIG. 1, with another coupling unit 42 being provided on the local end and another coupler 48 being provided on the remote end.

The coupling unit 42 can be formed, as shown in FIG. 2, from two separate couplers 44, 46. However, it can also be constructed together with the coupling unit 24. Through the use of the additional coupling unit 42, a portion of the power of the signal $S_R$ is decoupled from the optical waveguide 12 by means of the coupler 44 and is coupled into the optical waveguide 14 via the coupler 46 in the direction toward the remote end. This signal $R_{R,back}$, which is fed back in the direction toward the remote end and received there and which has a wavelength $\lambda_1$ that is different from the wavelength $\lambda_2$ of the transmit signal $S_T$.

The signal $S_{R,back}$ is decoupled at the remote end by means of the preferably wavelength-selective coupler 48 and fed to the receiving and evaluation unit 34. This unit converts the signal $S_{R,back}$ by means of an opto-electrical converter unit 50 contained by this receiving and evaluation unit into a corresponding electrical signal and feeds it to another event detector 50 also contained therein. The event detector 50, which can be constructed in the same way as the event detectors 38, 40, can check the signal fed to it and opto-electrically converted, $S_{R,back}$, for the presence of the same type of events as the event detectors 34, 40 or also for a different type, as a function of how the performance of the transmission link formed by the optical waveguide 12 is defined at the local-side demarcation line.

For example, the performance conclusion can be redefined by means of the events of a certain type appearing per unit time, with these events being detected by an event detector 50. The receiving and evaluation unit 34 can also store this information in the performance signal $S_P$ and can transmit it to any other locations or units.

However, because the signal $S_{R,back}$ received at the remote end also includes influences of the transmission path from the local end to the remote end, i.e., in particular, influences of the optical waveguide 14, the performance conclusion can be reached only in the way that it is assumed as a worst-case scenario that the agreed performance is fulfilled in each case at the local end, if this is determined not on the basis of a signal received at the local end, but rather on the basis of an additional signal transmitted back from the local end to the remote end.

As already mentioned above, the first and the second transmission paths can be formed by means of a single transmission medium, for example, by means of a single optical waveguide. Such an embodiment, whose function incidentally corresponds to the embodiment in FIG. 2, is shown in FIG. 3. Instead of two optical waveguides for the first or second transmission path, a single optical waveguide 13 is provided, which guides all of the optical signals. To allow optical separation of the optical signals guided in a direction, each is provided with polarization directions that are mutually orthogonal. Because the electrical signal processing after the opto-electrical or electro-optical conversion of the signals is identical to the embodiment in FIG. 2, in FIG. 3 only the purely optical transmission path between the remote end 16 and the local end 18 of the optical transmission link is shown.

The optical transmit signal $S_T$ at a wavelength $\lambda_2$ is fed with a first polarization direction $P_1$ to the transmission link at the local end 18. By means of a first, preferably wavelength-selective coupler 60, a portion of the optical power of the signal $S_T$ is decoupled and fed to a polarization rotation unit 62. This sub-signal represents the optical control signal and is therefore influenced in its polarization direction, so that it is orthogonal to the polarization direction $P_1$ of the transmit signal $S_T$. This optical signal with the polarization direction $P_2$ is then delayed by the predetermined delay time $T_D$ relative to the transmit signal $S_T$ by means of the delay unit 24 and is fed by means of another, wavelength-selective coupler 64 as optical control signal $S_C$ back to the optical waveguide 13. The couplers 60 and 64 are preferably created so that signals with the optical wavelength $\lambda_2$ are merely coupled to or decoupled from the optical waveguide 13.

In the region of the remote end 16, a wavelength-selective coupler 66 is provided, which separates the optical waveguide 13 of the signals with the wavelengths $\lambda_2$ or $\lambda_1$ into separate signal paths or combines these signals. In each separate signal path there is a splitting unit 68, which feeds its input optical signals with the orthogonal polarization devices $P_1$ and $P_2$ to separate signal paths.

Thus, the transmit signal $S_T$ and the optical control signal $S_C$ with the wavelength $\lambda_2$ are fed through the coupler 66 to the splitting unit 68 provided in the lower signal path in FIG. 3. This splitting unit separates the signals $S_T$ and $S_C$, so that these can be electro-optically converted and further processed at the remote end in the way explained in connection with FIG. 2.

In an analogous way, the receive signal $S_R$ is fed to the splitting unit 68 arranged in the remote-side signal path for the signals with the wavelength $\lambda_1$ at the port for signals of the polarization direction $P_1$. If this signal already exists as a signal with the polarization direction $P_1$, then a corresponding polarization filter can be eliminated in the splitting unit 68, or the splitting unit for feeding the signal $S_R$ with the wavelength $\lambda_1$ to the coupler 66 must not have a corresponding polarizing property. The signal $S_R$ is then fed to the optical waveguide 13 via the wavelength-selective coupler 66.

In the region of the local end, another, preferably wavelength-selective coupler 70 is provided, which decouples a portion of the power of the signal $S_R$ and feeds it to a polarization rotation unit 72. This unit rotates the polarization direction $P_1$ of the signal $S_R$ in the orthogonal polarization direction $P_2$ and feeds this signal $S_{R,back}$ to the other wavelength-selective coupler 74, which feeds the signal $S_{R,back}$ back to the optical waveguide 13 in the direction toward the remote end. In order not to allow also a signal path from the coupler 74 via the coupler 70, in the splitting unit 92 an optical isolator (not shown) can be provided, which absorbs the signal fed via the coupler 74 on the output side.

At the remote end, the signal $S_{R,back}$ is fed via the coupler 66 to the upper signal path in FIG. 3 and by means of the splitting unit to the relevant port for the signals of the polarization direction $P_2$. Thus, after the electro-optical conversion of the signal $S_{R,back}$, the signals $S_R$ and $S_{R,back}$ can be further processed at the remote end in the way (electrically) explained in connection with FIG. 2.

In the variant shown in FIG. 3, the couplers 60 and 64 as well as the delay unit 24 and the polarization rotation unit 62 can be combined to form a splitting-and-delay unit 30'. This can be easily installed at the local end 18, for the purpose of which the splitting-and-delay unit 30' can be connected with its input and output ports to the actual optical waveguide transmission link by means of detachable or non-detachable connection devices, for example, by means of plugs and/or sockets. The same also applies for the couplers 70 and 74, as well as the polarization rotation unit 72, which likewise can be combined to form a coupling unit 42'. Likewise, the splitting units 68 and the wavelength-selective coupler 66 can be combined to form a unit 76, which assigns signals of the wavelengths $\lambda_1$ and $\lambda_2$ and with the orthogonal polarization directions $P_1$ and $P_2$ each to different ports. Obviously, the units 30', 42', and 76, can also be realized like the units 24 and 30 in FIG. 1 or FIG. 2 by means of other components, as long as the functions described above with respect to input ports and output ports of these units are realized.

The above described exemplary embodiments are intended to illustrate the principles of the invention, but not to limit the scope of the invention. Various other embodiments and modifications to these example embodiments may be made by those skilled in the art without departing from the scope of the present invention.

The invention claimed is:

1. A method for monitoring a data transmission link, especially an optical, bidirectional data transmission link, received at a remote end of a transmission link, the method comprising:
    (a) receiving, at the remote end, a first digital transmit signal sent on a first transmission path from a local end of the data transmission link;
    (b) receiving, at the remote end on a second transmission path, a second digital control signal representing a portion of the power of the transmit signal, sent at the local end delayed by a predetermined non-zero delay time $(T_D)$;
    (c) checking the transmit signal received at the remote end and the control signal received at the remote end for the presence of one or more events of a certain type; and
    (d) determining a conclusion on the quality of the data transmission link as a function of a time correlation and a frequency of the one or more event's appearance in the received transmit signal and in the received control signal.

2. The method of claim 1, wherein determining a conclusion on the quality of the data transmission link further comprises determining that the cause of at least one of the one or more events is impairment of the two transmission paths, based on the appearance of the at least one event in the received transmit signal and in the received control signal delayed by an amount less than the amount of the difference between the signal propagation times via the first and second transmission paths.

3. The method of claim 1, wherein, for the appearance of an event in the received transmit signal and in the received control signal delayed essentially by the delay time $(T_D)$ plus the difference between the signal propagation times via the first and second transmission paths, the conclusion on the quality of the data transmission link is reached indicating that the cause of the event is a corresponding event that was already contained in the transmit signal before creation of the second digital signal.

4. The method of claim 1, wherein, for the appearance of an event either only in the received transmit signal or in the received control signal, the conclusion on the quality of the data transmission link is reached indicating that the cause of the event is either impairment of the first or the second transmission path.

5. The method of claim 1, characterized in that a time profile of the received transmit signal or the received control signal, or the time profile of corresponding signals derived from the received transmit signal and from the received control signal, in which at least one event appears, is evaluated with the preferably normalized cross-correlation function of these two signals or the time sections of these signals.

6. The method of claim 5, wherein:
    (a) in a first condition in which a normalized cross-correlation function $(K(\tau))$ has a value of one for a value of the time shift r of time segments of the received transmit signal and the received control signal to be correlated equal to the delay time $(T_D)$ plus the difference between the signal propagation times of the digital transmit signal and the digital control signal, the relevant events in the signals are not taken into account for reaching a conclusion on the quality of the data transmission link; and
    (b) in a second condition in which the normalized cross-correlation function $(K(\tau))$ has a value of zero for the time shift $\tau$, the relevant event in the appropriate signal is taken into account for reaching a conclusion on the quality of each path of the transmission link.

7. The method of claim 1 further comprising determining, in an initialization process, a total delay time $(T_{total})$ as a sum of the delay time $(T_D)$ and the difference between the signal propagation times in the first and second transmission paths.

8. The method of claim 1, further comprising transmitting, from the remote end, a second digital transmit signal on the second transmission path in the direction toward the local end of the data transmission link, for implementing a bidirectional data transmission link.

9. The method of claim 8, further comprising:
    (a) receiving a third control signal at the remote end, the third control signal including a portion of the power of the second digital transmit signal that was received on the second transmission path at the local end of the data transmission link, the portion of power of the second digital transmit signal having been coupled onto the first transmission path in the direction toward the remote end;
    (b) checking the third control signal at the remote end for the presence of events of the certain type or of a predetermined different type; and
    (c) reaching a conclusion on the quality of the second transmission path of the transmission link based at least partially on the number of events appearing per unit time.

10. A communications system for realizing and monitoring a data transmission link connecting a local end and a remote end, the system comprising:
    (a) a local end assembly adapted for coupling at the local end of the transmission link and comprising a splitting-and-delay unit constructed to split a transmit signal and feed it both to a first transmission path and, after a predetermined non-zero delay time $(T_D)$, to a second transmission path of the transmission link for transmitting in the direction toward the remote end; and
    (b) a remote end assembly adapted for coupling at the remote end of the transmission link and comprising a receiving and evaluation unit, which is constructed to (i) receive the transmit signal at the remote end on both the first and second transmission paths, and (ii) check the transmit signal received on the first transmission path and the transmit signal received on the second transmission path for the presence of one or more events of a certain type, and (iii) determine a conclusion on the quality of the data transmission link as a function of a time correlation and a frequency of the one or more event's appearance in the transmit signal received on the first transmission path and the transmit signal received on the second transmission path.

11. The system of claim 10, wherein the remote end assembly is further adapted to transmit a second signal on the second transmission path toward the local end assembly for implementing a bidirectional communications link, and further comprising a coupler unit provided at the local end of the transmission link, which is adapted to couple a portion of the power of the second signal, received at the local end from the second transmission path, into the first transmission path; and wherein the receiving and evaluation unit is further constructed to (i) receive the second signal at the remote end including a portion of the power of the second signal that was received on the second transmission path at the local end of the data transmission link, and (ii) check the received second signal at the remote end for the presence of events of the certain type or of a predetermined different type, and (iii) reach a conclusion on the quality of the second transmission path of the transmission link based at least partially on the number of events appearing per unit time.

12. An apparatus for use in realizing and monitoring a data transmission link connecting a local end and a remote end, the apparatus comprising:
(a) a remote end assembly unit adapted for coupling at the remote end of the transmission link; and
(b) a receiving and evaluation unit in the remote end assembly, the receiving and evaluation unit constructed to (i) receive a first digital transmit signal sent on a first transmission path from the local end of the data transmission link, and (ii) receive, at the remote end on a second transmission path, a second digital control signal representing a portion of the power of the transmit signal, sent at the local end delayed by a predetermined non-zero delay time ($T_D$), and (iii) check the transmit signal received at the remote end and the control signal received at the remote end for the presence of one or more events of a certain type; and (iv) determine a conclusion on the quality of the data transmission link as a function of a time correlation and a frequency of the one or more event's appearance in the received transmit signal and in the received control signal.

13. The apparatus of claim 12, wherein the remote end assembly is further adapted to transmit a second signal on the second transmission path toward the local end for implementing a bidirectional communications link, the receiving and evaluation unit further constructed to (i) receive the second signal at the remote end including a portion of the power of the second signal that was received at the local end from the second transmission path and fed into the first transmission path toward the remote end, and (ii) check the received second signal at the remote end for the presence of events of the certain type or of a predetermined different type, and (iii) reach a conclusion on the quality of the second transmission path of the transmission link based at least partially on the number of events appearing per unit time.

* * * * *